F. W. ERICKSON.
COUPLING FOR METAL PIPES.
APPLICATION FILED APR. 22, 1920.
1,352,256.
Patented Sept. 7, 1920.
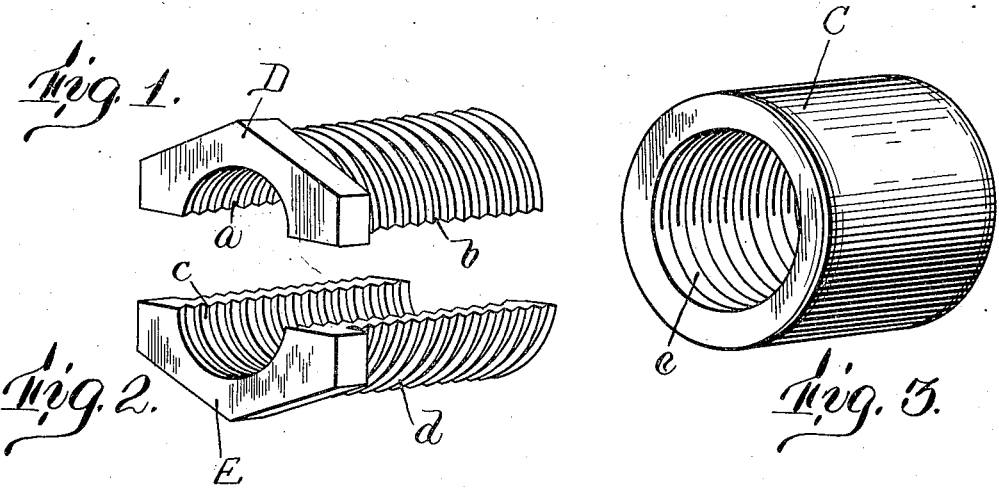
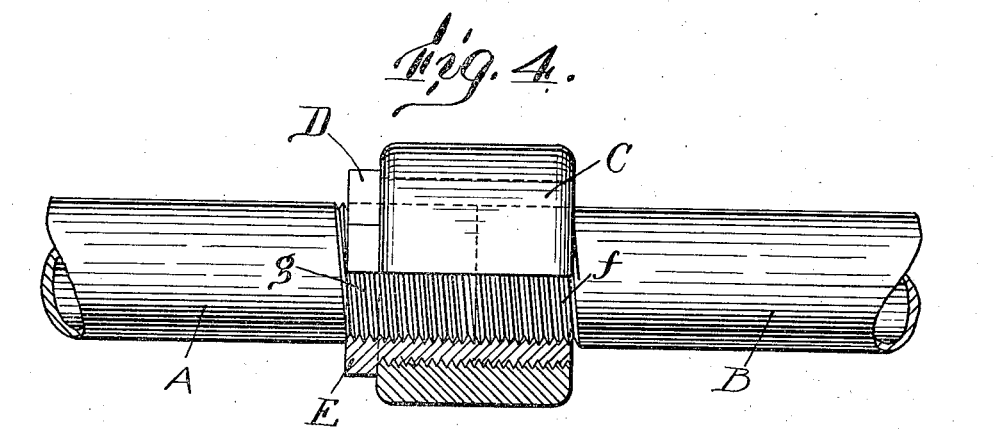
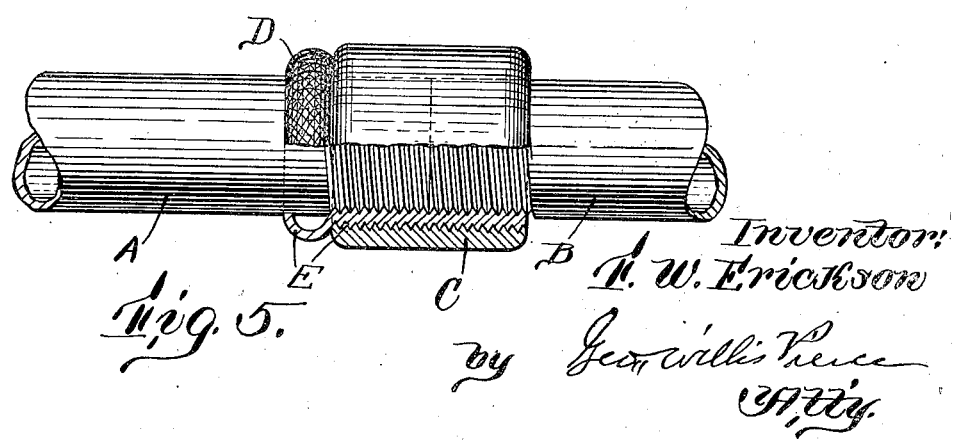
Inventor:
F. W. Erickson
by Geo. Willis Pierce
Atty.

UNITED STATES PATENT OFFICE.

FREDERIC WM. ERICKSON, OF EAST GREENWICH, RHODE ISLAND.

COUPLING FOR METAL PIPES.

1,352,256.      Specification of Letters Patent.      Patented Sept. 7, 1920.

Application filed April 22, 1920. Serial No. 375,661.

*To all whom it may concern:*

Be it known that I, FREDERIC WM. ERICKSON, residing at East Greenwich, in the county of Kent and State of Rhode Island, have invented certain Improvements in Couplings for Metal Pipes, of which the following is a specification.

The present invention relates to pipe couplings, and has particular reference to devices of the character which will couple together ordinary pipes the ends of which have no special formations such as flanges or lips. Ordinary pipes of this character are usually externally threaded at their ends and are connected by couplings which, when applied, are either rotated or are held while a pipe section is rotated. Usually so many rotations are required to bring the ends of the pipe sections together, that a very considerable expenditure of time and effort is required to complete the operation.

The object of my invention is to provide a coupling which can be applied to position after the ends of two simple and duplicate pipe sections to be coupled are brought into contact, and which can then be quickly secured so as to remain in holding position.

With this object in view, the invention consists in the improved coupling substantially as hereinafter described and claimed.

Of the accompanying drawings:—

Figures 1 and 2 are perspective views of the two mating halves of the bushing or divided member of the coupling.

Fig. 3 is a perspective view of the sleeve member.

Fig. 4 is a side elevation, partly broken out, of two pipes connected by the coupling.

Fig. 5 is a view similar to Fig. 4, illustrating the divided member of the coupling as made of sheet metal stamped or rolled to shape, instead of having cut threads as in the other figures.

The pipe sections A and B are of ordinary form having straight cylindrical threaded end portions, and the sleeve member C is of the kind known as a standard pipe coupling or union.

Instead of employing a union C having an internal diameter threaded to engage and fit the threads $f$, $g$, of the pipes (Fig. 4), the union employed is of larger diameter to admit, between it and the pipes the half-cylindrical threaded portions of the two bushing members D, E. The bushing half D is internally threaded as at $a$ to fit the threads of one of the pipe sections and is externally threaded as at $b$ to be engaged by the internal threads $e$ of the union C. The other bushing half E is similarly internally and externally threaded as at $c$, $d$. The two members D, E, may be thick at one end and have flat faces to be engaged by a wrench (Figs. 1, 2 and 4) or may be formed as shown in Fig. 5 and externally knurled.

In use, two ordinary pipes such as shown at A and B are simply butted together, it being assumed that the union C is already loosely mounted on one of the pipes if the other end of that pipe is not free to have said union slipped onto and along it. The two bushing members D, E, are laid against opposite sides of the butted ends of the pipes and their straight edges brought into contact, and then the union C is screwed onto the said bushing members as shown in Figs. 4 and 5.

As the members D, E, are of uniform internal diameter from end to end, they may be so placed longitudinally relatively to the butting ends of the pipes as to engage one of said pipes more than the other. In other words, the coupling as a whole requires no accurate lengthwise position in order to perform its function, and serves for ordinary commercial pipes. And as the members D, E, are also of uniform diameter the entire length of their external threaded portions, they are adapted to be secured in operative positions by an ordinary commercial union such as the sleeve C.

Having now described my invention, I claim:

1. A coupling to unite the ends of metal conduits comprising a bushing consisting of a plurality of complementary externally threaded members of uniform internal diameter from end to end and internally threaded, the externally threaded portions being also of uniform diameter, and an internally threaded sleeve to engage the external threads of the bushing members and confine said members in engagement with the conduits.

2. A coupling to unite the ends of metal conduits comprising a bushing consisting of a pair of complementary semi-cylindrical externally threaded members of uniform internal diameter from end to end and internally threaded to engage threaded portions of said conduits, the externally threaded portions being of uniform diameter, and an internally threaded sleeve to engage the external threads of the bushing members and confine said members in engagement with the conduits.

3. The combination with the screw-threaded ends of two metal conduit pipes, of a coupling composed of three members two of which are alike and are semi-cylindrical and are of uniform internal diameter from end to end and are externally and internally screw-threaded, the threaded portions of the members being of uniform diameter, the third member or union comprising an internally screw-threaded cylinder adapted to engage the external threads of the aforesaid two members and couple them.

In testimony whereof, I have signed my name to this specification in the presence of two subscribing witnesses, this 15th day of April, 1920.

FREDERIC WM. ERICKSON.

Witnesses:
 LEILA H. ERICKSON,
 ELSIE M. WOOD.